W. L. KOVAR & W. WLHA.
HARROW CULTIVATOR ATTACHMENT.
APPLICATION FILED JAN. 11, 1912.
1,034,255.  Patented July 30, 1912.
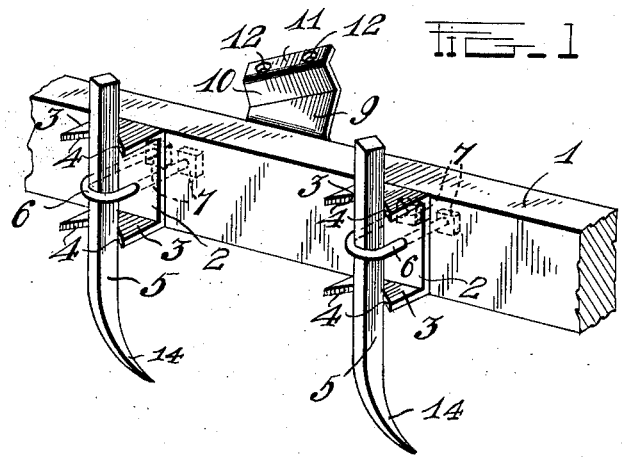
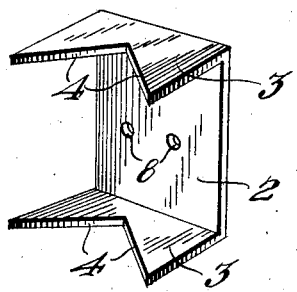
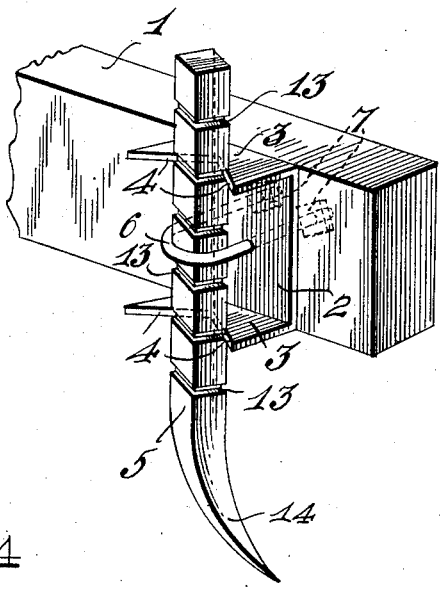
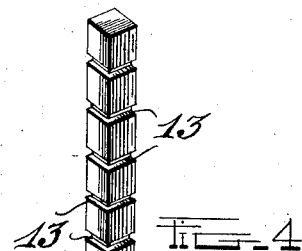
Witnesses
Inventors
W. L. Kovar
and W. Wlha
By E. E. Vrooman,
their Attorney

UNITED STATES PATENT OFFICE.

WILLIAM L. KOVAR AND WILLIAM WLHA, OF MERLE, TEXAS.

HARROW-CULTIVATOR ATTACHMENT.

1,034,255. Specification of Letters Patent. Patented July 30, 1912.

Application filed January 11, 1912. Serial No. 670,648.

*To all whom it may concern:*

Be it known that we, WILLIAM L. KOVAR and WILLIAM WLHA, citizens of the United States, residing at Merle, in the county of Burleson and State of Texas, have invented certain new and useful Improvements in Harrow-Cultivator Attachments, of which the following is a specification, reference being had therein to the accompanying drawing.

This invention relates to harrows and has for its object the production of an efficient means for securing the harrow teeth in an adjusted position upon the harrow bar.

Another object of this invention is the production of an efficient harrow tooth engaging plate whereby the tooth may be firmly held in engagement therewith.

With these and other objects in view this invention consists of certain novel constructions, combinations, and arrangements of parts, as will be hereinafter fully described and claimed.

In the drawings Figure 1 is a perspective view of a portion of the harrow bar showing the harrow teeth connected thereto. Fig. 2 is a detail perspective of the harrow tooth gripping plate. Fig. 3 is an embodiment of our invention showing a harrow tooth provided with a plurality of notches for engaging the harrow tooth engaging plate. Fig. 4 is a detail perspective of the harrow tooth as illustrated in Fig. 3.

Referring to the drawings by numerals 1 designates the harrow bar which carries a plurality of harrow engaging plates 2. These harrow engaging plates 2 are substantially U-shaped and have their tooth engaging flanges 3 provided with substantially V-shaped notches 4 to receive the harrow teeth 5. The harrow teeth 5 are placed within the V-shaped notches 4 of the tooth engaging plates 2 having two of their faces engaging the side walls of the V-shaped notch 4 as indicated in Fig. 1. These harrow teeth 5 are held within the notches 4 by means of substantially U-shaped bolts 6. These bolts are held in engagement with the harrow beam 1 by means of nuts 7, and pass through apertures 8 formed centrally of the plate 2.

A supporting plate 9 is secured to the harrow beam 1 and has a bent portion 10 which extends at an angle to the main portion 9. This angle portion 10 is provided with an angle flange 11 which flange is provided with a plurality of apertures 12 for allowing the harrow beam 1 to be secured to the usual supporting means.

In Fig. 3, we have disclosed an embodiment of our invention wherein the harrow teeth are provided with a plurality of notches 13 which notches are adapted to engage the side walls of the V-shaped notches 4 for more firmly holding the harrow teeth in vertical adjusted position. Of course, any desired harrow tooth may be used so long as the tooth will fit in engagement with the plate 2, but in the present instance it is desirous to have the teeth provided with the usual curved lower ends 14.

From the foregoing description it will be obvious that a very efficient and durable harrow tooth engaging member has been produced which may be very cheaply manufactured in view of the fact that the same may be struck from sheet metal or otherwise formed thereby producing a very cheap article. It will also be obvious that a very efficient structure has been produced in view of the fact that the U-shaped bolt 6 not only assists in holding the shank in engagement with the plate 2 but also holds the plate 2 in engagement with the harrow bar 1. In the structure as disclosed in Fig. 3, it will be obvious that the notches 13 will form a very rigid supporting means whereby the harrow tooth will be firmly braced against vertical movement upon the bar 1.

What is claimed is:—

An attaching plate provided with an upper and lower flange, said flanges being provided with a substantially V shaped outer edge, a harrow tooth provided with a plurality of annular grooves, the V shaped edges of said flanges fitting in certain of said grooves, and means for removably holding said tooth in place.

In testimony whereof we hereunto affix our signatures in presence of two witnesses.

WILLIAM L. KOVAR.
WILLIAM WLHA.

Witnesses:
W. L. ADAMS,
BAHUS JANAC.

Copies of this patent may be obtained for five cents each, by addressing the "Commissioner of Patents, Washington, D. C."